United States Patent
Rosenbloom et al.

(10) Patent No.: US 7,627,645 B2
(45) Date of Patent: Dec. 1, 2009

(54) REMOTELY CONTROLLING PLAYBACK OF CONTENT ON A STORED DEVICE

(75) Inventors: Oren Rosenbloom, Redmond, WA (US); Vladimir Sadovsky, Bellevue, WA (US); Konstantin Roslyakov, Redmond, WA (US); Mysore Y. Jaisimha, Kenmore, WA (US); Blake Manders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/166,714

(22) Filed: Jun. 27, 2005

(65) Prior Publication Data

US 2006/0293769 A1 Dec. 28, 2006

(51) Int. Cl.
*G06F 15/167* (2006.01)

(52) U.S. Cl. ............................ 709/216; 709/208

(58) Field of Classification Search ............... 709/208, 709/209, 227, 228, 211, 212, 216
See application file for complete search history.

(56) References Cited

U.S. PATENT DOCUMENTS

| | | | | |
|---|---|---|---|---|
| 6,198,479 B1 * | 3/2001 | Humpleman et al. | ........ | 715/733 |
| 6,199,104 B1 * | 3/2001 | Delph | ........ | 709/208 |
| 6,289,382 B1 * | 9/2001 | Bowman-Amuah | ........ | 709/226 |
| 6,731,688 B1 * | 5/2004 | Johnson | ........ | 375/257 |
| 7,043,534 B1 * | 5/2006 | Donnelly et al. | ........ | 709/217 |
| 7,124,374 B1 * | 10/2006 | Haken | ........ | 715/859 |
| 7,536,486 B2 * | 5/2009 | Sadovsky et al. | ........ | 710/11 |
| 2001/0025377 A1 * | 9/2001 | Hinderks | ........ | 725/109 |
| 2002/0029256 A1 * | 3/2002 | Zintel et al. | ........ | 709/218 |
| 2002/0109718 A1 * | 8/2002 | Mansour et al. | ........ | 345/744 |
| 2003/0229900 A1 * | 12/2003 | Reisman | ........ | 725/87 |
| 2004/0047290 A1 * | 3/2004 | Komandur et al. | ........ | 370/230 |
| 2004/0057699 A1 * | 3/2004 | Kim et al. | ........ | 386/95 |
| 2004/0064518 A1 * | 4/2004 | Almstrand et al. | ........ | 709/208 |
| 2004/0203975 A1 * | 10/2004 | Chen et al. | ........ | 455/517 |
| 2004/0220926 A1 * | 11/2004 | Lamkin et al. | ........ | 707/3 |
| 2004/0221163 A1 * | 11/2004 | Jorgensen et al. | ........ | 713/182 |
| 2004/0249994 A1 * | 12/2004 | Shapiro et al. | ........ | 710/21 |
| 2005/0080915 A1 * | 4/2005 | Shoemaker et al. | ........ | 709/231 |
| 2005/0258806 A1 * | 11/2005 | Janik et al. | ........ | 320/155 |
| 2006/0294064 A1 * | 12/2006 | Rosenbloom et al. | ........ | 707/3 |

OTHER PUBLICATIONS

PCT/US2006/15972; Notification of Transmittal of International search Report and the Written Opinion of the International Searching Authority, or the Declaration, mailed Apr. 25, 2008.

* cited by examiner

*Primary Examiner*—Krisna Lim
(74) *Attorney, Agent, or Firm*—Shook, Hardy & Bacon LLP

(57) ABSTRACT

A system, method, and computer-readable media are disclosed for remotely controlling playback of content stored on a device. The system, method, and computer-readable media can transmit state-based commands from a host unit to the device in order to control playback of the content. The host unit can control playback of the content without requiring the device to transfer the content to the host unit. The host unit can also be updated as soon as there is a change in any state of the device.

19 Claims, 5 Drawing Sheets

US 7,627,645 B2

REMOTELY CONTROLLING PLAYBACK OF CONTENT ON A STORED DEVICE

STATEMENT REGARDING FEDERALLY SPONSORED RESEARCH OR DEVELOPMENT

Not applicable.

CROSS-REFERENCE TO RELATED APPLICATION

Not applicable.

BACKGROUND

Currently, portable media devices can connect to host units and can transmit content to the host units as well as exchange content between other devices connected to the host units. Current technology also allows the host unit to control the playback of content from the portable media device. For example, a portable audio player can connect to an automobile's media receiver and the portable audio device's content can be controlled and played back from controllers on the automobile media receiver or through controllers integrated within the automobile's steering wheel.

Once a portable media device is connected to a host unit, the host unit can control playback of content on the portable media device by first reading the particular device and then reading the content stored on the portable device. The host unit can then receive the content from the portable device and playback the content using its controllers. Such an implementation is literally a remote transfer followed by playback; as this implementation does not actually play the content from the portable device. This implementation is disfavored as the content is transferred away from the portable media device to the host unit and then played from the host unit.

A problem with this implementation arises when dealing with portable media devices that contain Digital Rights Management (DRM) protected content. With DRM protected content, the portable media devices themselves must be registered in order to subscribe to receive the DRM protected content. Only registered devices can receive and playback DRM protected content. One's automobile media receiver, set-top box, or printer could not have the DRM protected content transferred to them as they would not be legitimate devices registered to receive and playback the DRM protected content. Another problem is that a host unit may be able to playback one particular metadata or codec such as MP3, however, not all host units can playback all different types of metadata and codecs. So a situation could arise where a registered portable media device may be able to play the DRM protected content, however, various host units may not be able to playback the different formats of content.

Another way in which current technology attempts to allow a host unit to control playback of a portable media device is to enable the host unit to send interrupt-based commands to the portable media device: such as telling it to skip, play, pause, etc. The problem with having an interrupt-based system of controlling portable media devices is that it does not allow the host unit to have an existing playback paradigm. By controlling through interrupts, the host unit will not know what state the device is in, which will lead to host units trying to remote the user interface of the portable media device to the controller of the host unit, instead of allowing the controller to verify what is on the device and to check what is the playback state of the device.

SUMMARY

A system is disclosed for remotely controlling playback of content stored on a device that overcomes the deficiencies found in the current technology. The system can include at least one host unit for controlling playback of content stored on a device without requiring the content to be transferred to the host unit. The system may additionally include at least one state-based controller coupled to the host unit to allow the host unit to remotely control the playback of the content through state-based commands.

A method for remotely controlling playback of content stored on a device is further disclosed. The method can include remotely transmitting state-based commands to a device for controlling playback of content stored on the device. The method may additionally include the content being played back without requiring the content to be transferred away from the device. Moreover, the method can include updating at least one host unit when a state of the device has changed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
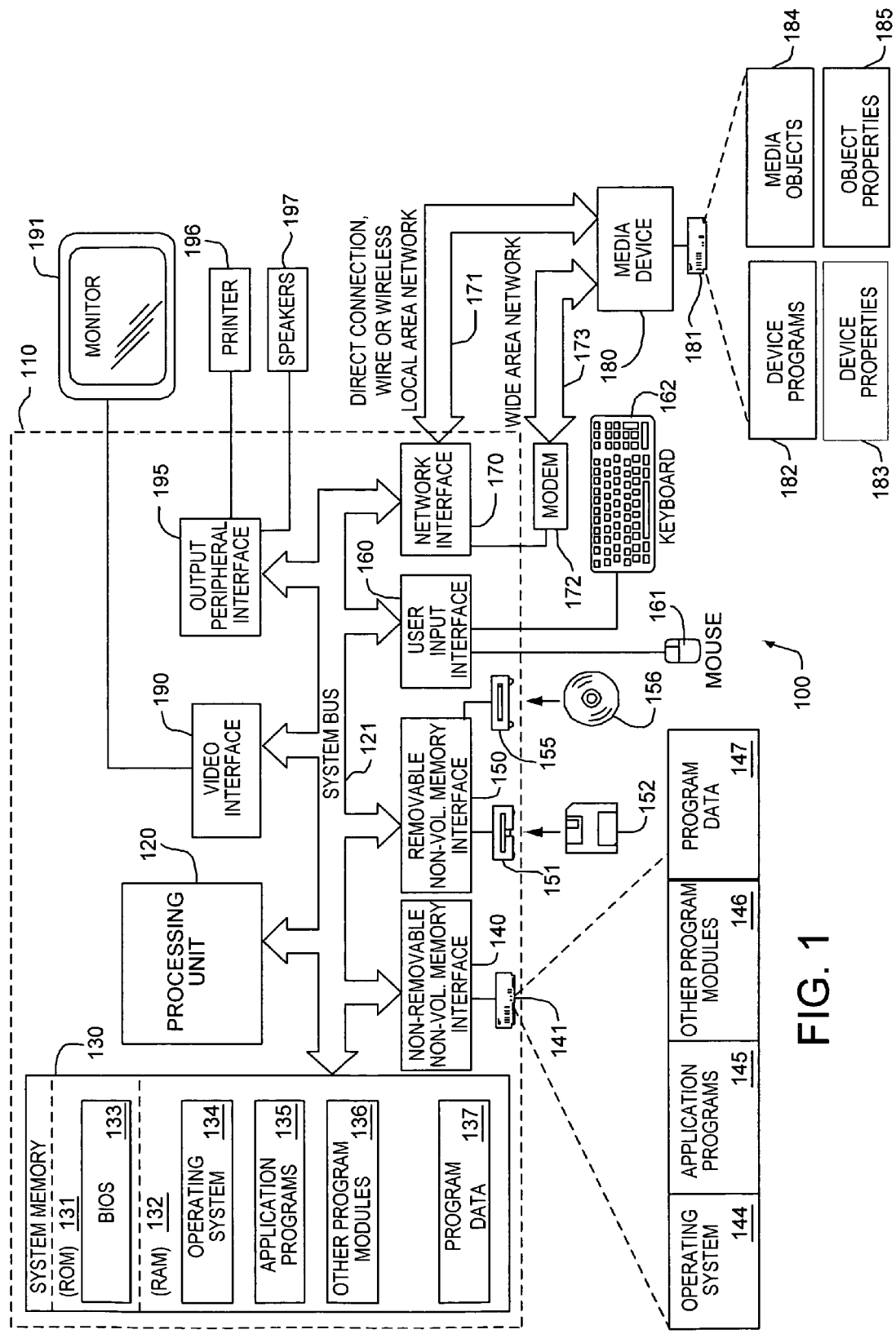
FIG. 1 illustrates an example of a suitable computing system environment on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 182, 183, 184 and 185 as residing on memory device 181. In the displayed embodiment, device programs 182, device properties 183, media objects 184, and object properties 185 are included. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
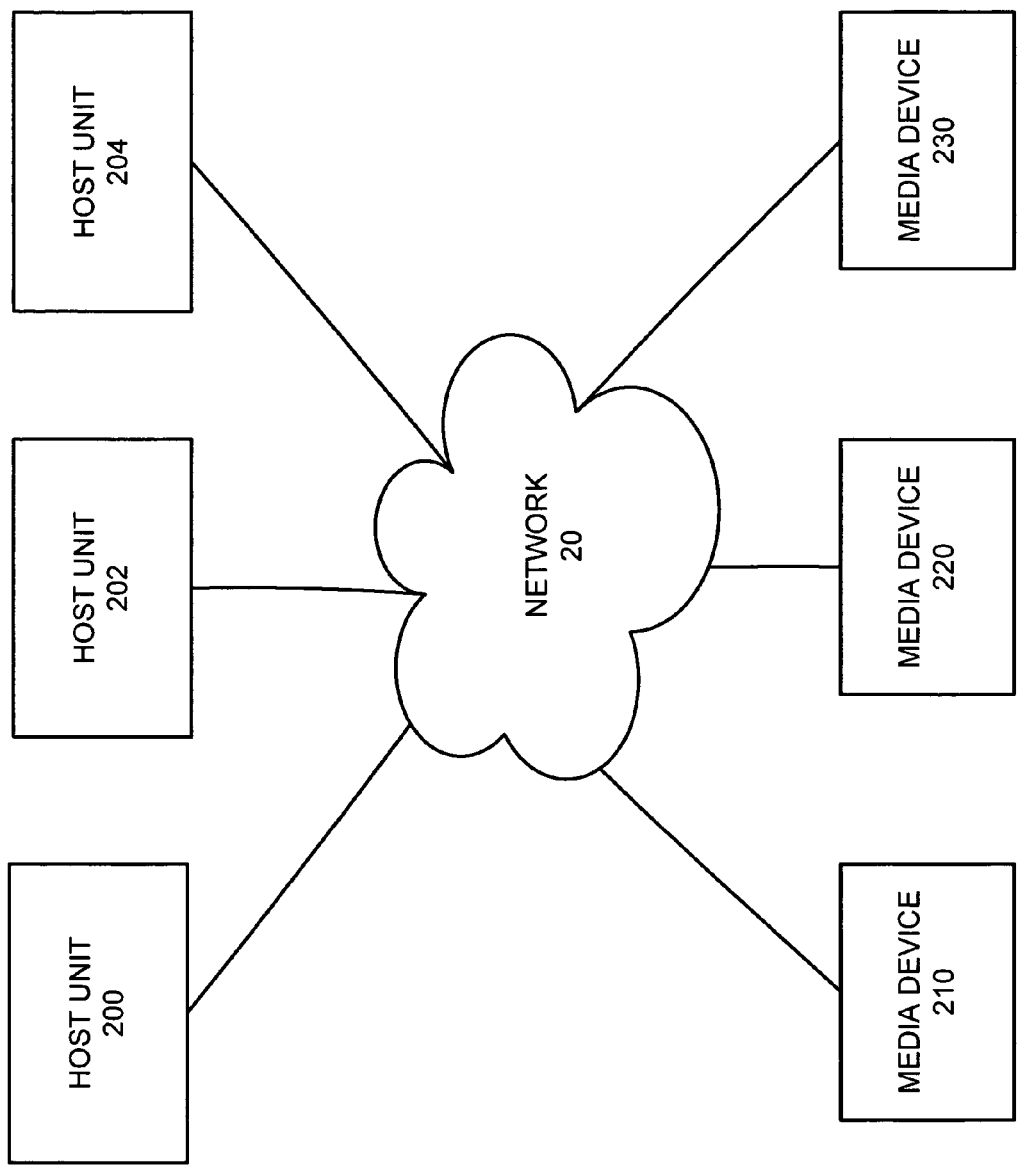
FIG. 2 illustrates a block diagram showing an embodiment of a system of the invention.

FIG. 2 is a block diagram showing an embodiment of a system of the invention. The system includes a plurality of host units 200, 202, and 204 capable of communicating over a network 20 with a plurality of media devices 210, 220, and 230. The host units 200, 202, and 204 can typically be similar to the computing devices 110 described above in reference to FIG. 1. The media devices 210, 220, and 230 represent a plurality of media devices belonging to different categories. These media devices include digital still camera devices, digital video cameras (with or without still image capture functionality), portable media players such as personal music players and personal video players, cell phones (with or without media capturing/playback capabilities), and other media devices. The media devices 210, 220, and 230 will typically be divided into categories, each category having a distinct set of properties. The network 20 may be any type of network such as those described above with reference to FIG. 1.

Figure 3:
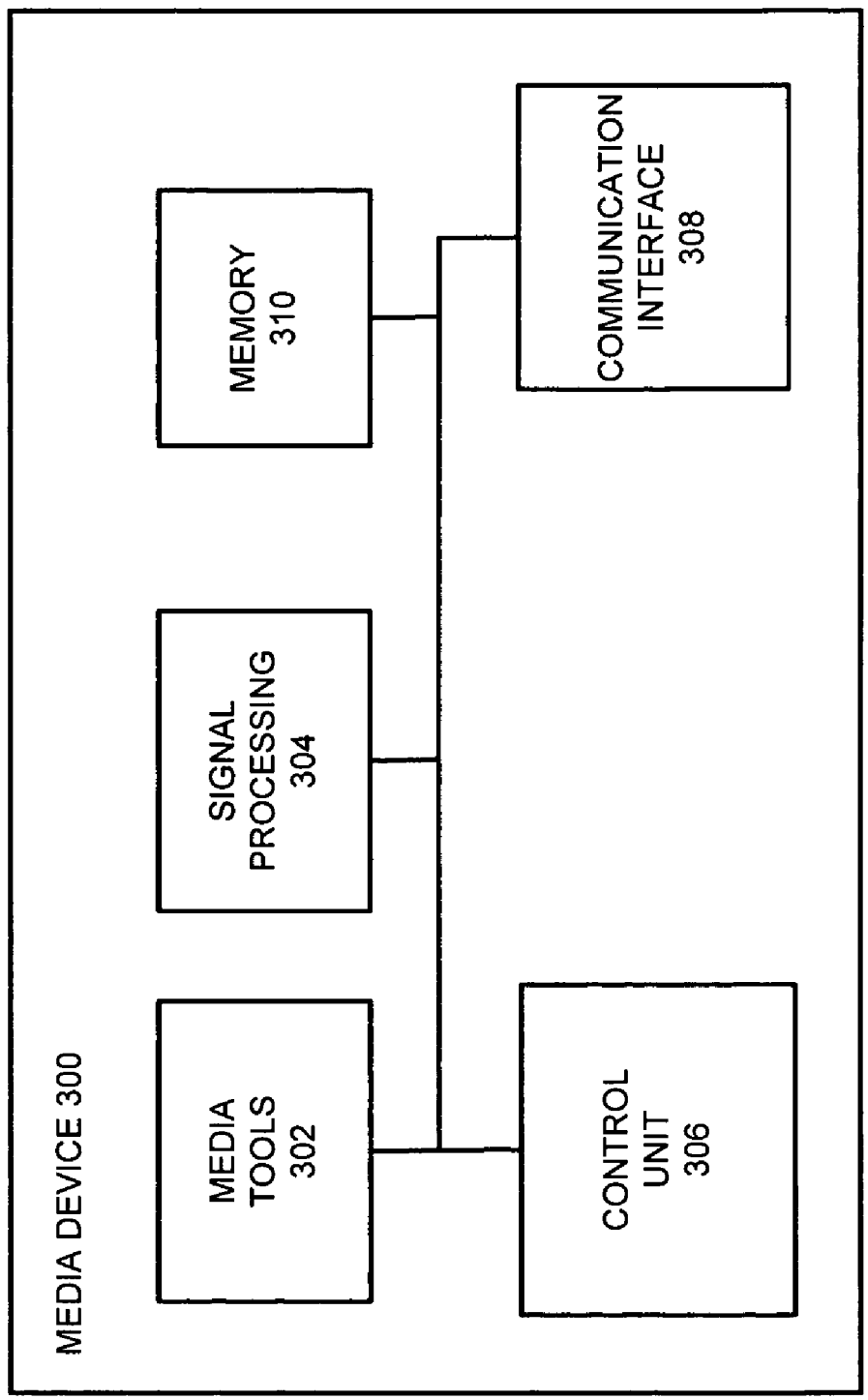
FIG. 3 illustrates is a block diagram of a media device in accordance with an embodiment of the invention.

FIG. 3 is a block diagram illustrating a media device 300 in accordance with an embodiment of the invention. Media device 300 may fit into one of a plurality of categories similar to media devices 210, 220, and 230. Media device 300 can be a detailed representation of media devices 210, 220, and 230 and can include features that can also be found in media devices 210, 220, and 230. The particular features of the media device 300 depend upon whether the media device 300 is a media player including a digital still camera device, a digital video camera (with or without still image capture functionality), a portable media player such as a personal music player or personal video player, a cell phone (with or without media capturing/playback capabilities), and other media device. The media device includes media tools 302, a signal processing device 304, a control unit 306, a communication interface 308, and a memory 310. The communication interface 308 enables the media device 300 to interact with the host units 200, 202, and 204 (FIG. 2). The media tools 302 are specific to the selected media device 300. If the media device 300 is a video or digital camera, the media tools 302 may include an image capturing unit. If the media device 300 is an audio device, the media tools 302 may be audio recording and playing tools. The communication interface 308 may be an interface that requires the media device 300 to be directly plugged into the host units 200, 202, and 204 or allows it to be connected to the host units over the Internet. In one embodiment, the device 300 is connected to the host units 200, 202, and 204 via a wireless interface.

Communication interface 308 can also allow media device 300 to interact and share data with other media devices. For example, media device 300 can communicate with media devices 210, 220, and 230 by sharing a common communication protocol. One such protocol is Media Transfer Protocol (MTP). MTP has been developed to manage content on any portable media device with storage. MTP is based upon an existing protocol, Picture Transfer Protocol (PTP), and can be implemented to be fully compatible with PTP. The primary purpose of MTP is to facilitate communication between devices that connect to a computer or other host, exchange data, and then disconnect for standalone use. A secondary purpose of MTP is to enable command and control of a connected device. This includes remote control of device functionality, monitoring of device-initiated events, and reading and setting device properties.

Figure 4:
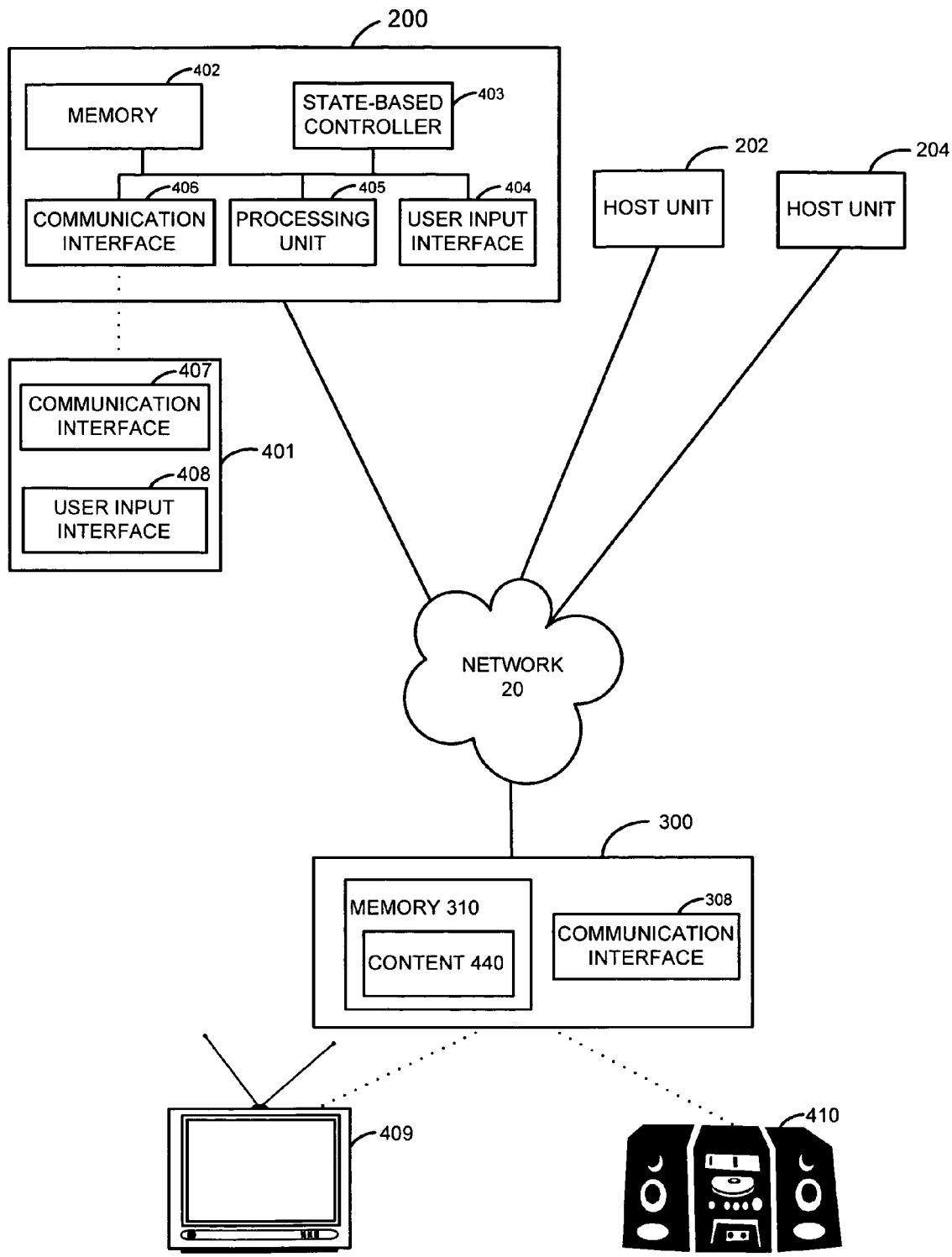
FIG. 4 illustrates another exemplary embodiment of a system of the invention.

FIG. 4 is block diagram illustrating another exemplary embodiment of a system of the invention. Host units 200, 202, and 204 can include memory 402, state-based controller 403, user input interface 404, processing unit 405, and communication interface 406. Host units 200, 202, and 204 are not limited to only these components and can also include components similar to those found in computer 110. The communication interface 406 may be an interface that requires the host unit 200 to be directly connected to media device 300 or allows it to be connected to media device 300 over the Internet. In one embodiment, the host unit 200 is connected to the media device 300 via a wireless interface.

User input interface 404 may be coupled to input devices outlined above with reference to FIG. 1 which can allow a user to enter commands to remotely control playback of content 440 stored on media device 300. Memory 402 and processing unit 405 can include elements equivalent to those found in corresponding memory and processing unit in FIG. 1. Remote controller 401 includes communication interface 407 and user input interface 408 which are equivalent to communication interface 406 and user input interface 404 respectively found in host unit 200. With use of remote controller 401, a user obtains the ability to remotely control playback of content 440 stored on media device 300 at locations/distances away from the actual host unit 200 by not requiring the user to physically interact with user input interface 404. Communication interface 407 may be an interface that requires the remote controller 401 to be directly connected to host unit 200 or allows it to be connected to the host unit 200 over the Internet. In one embodiment, the remote controller 401 is connected to the host unit 200 via a wireless interface.

State-based controller 403 is utilized to transmit state-based commands to the media device 300 from user input interfaces 404 and 408 in order to control the playback of content 440 stored on media device 300. Through use of state-based controller 403, the host unit 200 can control the playback of content 440 stored on media device 300 without any installation, drivers, or set-up. Unlike the present invention, previous technology has attempted to remotely control media devices by sending interrupt-based commands to a media device, such as telling the media device to skip, play, pause, etc. A problem with having an interrupt-based system of controlling portable devices is that it does not allow the host unit to have an existing playback paradigm. By controlling through interrupts, the host unit will not know what state the device is in. Interrupt-based controlling merely allows the host unit to remote the user interface of the portable device instead of allowing the host unit to verify what content is on the device and to check the playback state of the device.

Figure 5:
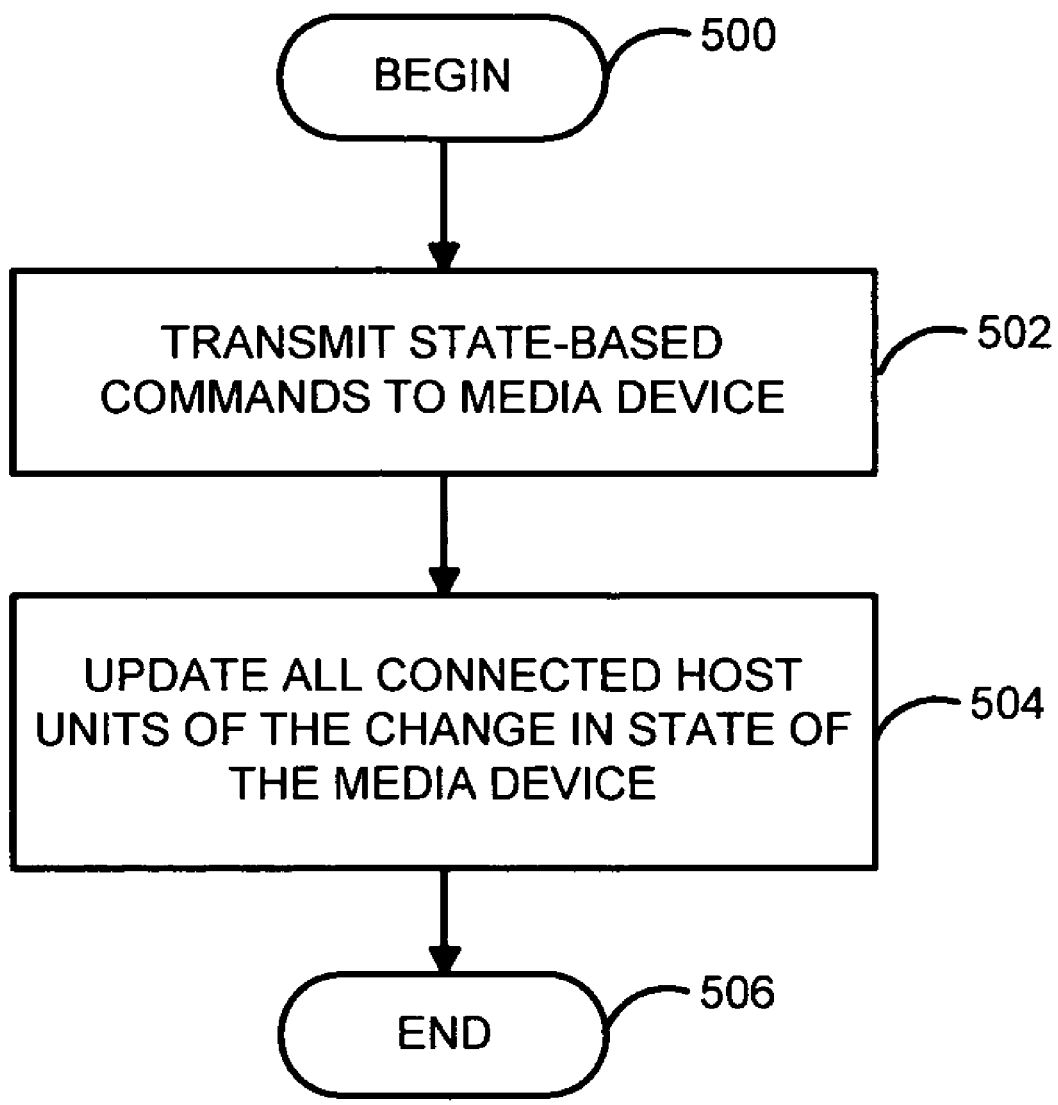
FIG. 5 illustrates a flow chart of multiple host units controlling playback of content stored on a media device.

Unlike a interrupt-based controller, state-based controller 403 can discern the nature of the content stored on a media device and can verify the playback state of the media device. When there is a change in state in a media device, a host unit can immediately be notified. The same is true for multiple host units connected to a single media device. For example, in FIG. 4 host units 200, 202, and 204 can be connected to media device 300 and can equipped to remotely control the playback of content 440 stored on media device 300. FIG. 5 illustrates a flow chart of multiple host units controlling playback of content stored on a media device. Each host unit 200, 202, and 240 can transmit 502 state-based commands to media device 300 in order to control playback of content 440. When there is a change in a state of the media device 300, such as a song change, a skip command, a fast-forward command, etc., each host unit can be notified and updated 504 of the change in state. Because the state can always be queried by any host unit, if the state of media device 300 changes, all host units connected to media device 300 can be updated of the change.

The difference between interrupt-based controllers and state-based controllers can be further explained in the following example. Suppose a user wants to set up a macro on his television or stereo. The user can set the macro so that his interrupt-based remote controller will send five commands in a quick succession. However, if one of those commands is interrupted and does not go through, the whole macro is broken and the state is unknown. However, using a state-based controller, if one command fails the state-based controller would know where the macro failed and would be able to recover. Through use of a state-based controller, a host unit can fully inspect, understand, and control a media device.

With the present invention playback control, unlike object exchange, can be a stateful process. When controlling playback, the current state of the device can be required to determine what the next state should be. In order to accomplish state-based playback control of the present invention and to allow multiple sessions to co-exist with this functionality (such as an audio host unit splicing in with a media device's user interface), state-based controlling can be implemented including four different device properties: Playback Rate, Playback Object, Playback Container Index, and Playback Position. These properties not only serve to indicate the current state of a media device, but through a protocol-specific method of updating these properties, also can serve to control the state of the device. When the state of a media device (as exposed by device properties) is changed, through outside intervention or the usual functioning of the device, this change can be communicated to all connected devices through a protocol-specific device property change event mechanism. In addition, there is one set of operations, forward and backward skip, which relies on information that may be disadvantageous to expose such operations to a state-based controller. The execution of the operations such as forward and backward skip can involve a non-state-based operation, which can provide multi-parameter control.

Playback Rate

In some embodiments, the Playback Rate can identify the current speed of playback, which is some embodiments can be identified linearly. The Playback Rate in some embodiments can be a signed 32-bit integer, which can identify the speed in thousandths. In other embodiments a different size bit may be utilized along with a different parameter of speed. For example, a value of 1,000 may indicate that the playback should proceed at full speed, a value of 500 may indicate that playback should be at half-speed, a value of −1,000 may indicate that playback should be in reverse at full speed, and value of 0 may indicate that the media device is paused.

Playback Object

In some embodiments, the Playback Object can identify the object currently being played back on the media device, which additionally may be identified by an Object Handle. The Playback Object property can have special values. For example, in some embodiments a value of 0x00000000 may indicate that the media device is currently stopped, and no media file is being consumed. Media devices which support playlist or album objects can allow the Playback Object property to contain a handle of an album or playlist. In some embodiments, if a media device supports these object types, as well as playback control, it may also support the Playback Container Index device property. In other embodiments, if the Playback Object property contains an album or playlist object, the Playback Object property may indicate that the media device is currently playing back the contents of that album or playlist. In some embodiments, whenever the object being played back is updated on the media device (for example, due to a previous object finishing playback, user input on the device, or active control on another active session) the media device can indicate this by initiating a DevicePropChanged event.

Playback Container Index

In some embodiments, the Playback Object device property may contain a container object (album, playlist, etc.) when playing an object. In this case, it may be important to expose the specific object in that playback container which is being consumed. The object being played may be identified by its index within an Object References array of the particular playback container, and that index can be contained in this property. Arrays in MTP may be, for example, zero-based. Therefore, some embodiments may include a value of 0x00000000 that may indicate that a first Object Handle in a Object References array is being consumed. In such embodiments, if the Playback Object does not represent a container object, this property can contain a value of 0x00000000.

Playback Position

In some embodiments, the Playback Position can identify the current time offset of the object currently being played back in milliseconds. In other embodiments, the Playback Position can identify the current time offset of the object being played back using a different time parameter. During playback, this property may change frequently, and those changes may not result in DevicePropChanged events unless they are caused by actions that may be external to both the current session and the regular playback of the object.

Skip

The Skip operation can update the current object being played back by skipping either ahead or behind in a device-specific ordering of objects (in some embodiments the ordering can be defined by the media device for its own independent playback of objects). In some embodiments, the Skip operation may require one parameter, including a signed INT32 value, which can indicate the depth and direction into the playback queue to which the current playback object should skip. In other embodiments, more than one parameter may be used which may include a different signed value.

In some embodiments, a value of 1, for example, may indicate that the device should skip ahead one media object to the object immediately following the object currently identified by the Playback Object (and optionally Playback Container Object if the Playback Object is a container). In some embodiments, a value of −1, for example, may indicate that the previous object in the device playback queue should be loaded as the current playback object. In such embodiments, if a media device supports the Skip operation, it may also support values of [−1,1]. In some embodiments, if a value not supported by a media device is passed, and the media device is incapable of interpreting the value, a response code of Invalid_Parameter may be returned. In such embodiments, if a value of 0, for example, is passed, the Skip operation may fail with a response code of Invalid_Parameter.

The present invention also has an advantage of not requiring content 440 to be transferred to host unit 200, 202, or 204 in order for the host unit to control the playback of the content. By requiring the content 440 to be transferred to a host unit for playback, the host unit cannot remotely control playback of content that is Digital Right Management (DRM) protected. With DRM protected content, the media devices themselves must be registered in order to subscribe to receive the DRM protected content. Only registered devices can receive and playback the DRM protected content. If the host unit is not a registered device, it therefore cannot playback the DRM protected content. The present invention eliminates any conflict when dealing with DRM protected content by utilizing state-based controller 403 to remotely control the playback of content 404 without requiring the content 404 to be transferred to the host unit 200. State-based controller 403 can simply send state-based commands to media device 300 in order to control the playback of content 440. Media device can then send multimedia signals, depending on the type of media device and content, to monitor 409 or audio system 410 in order for a user to see or hear the content 440 stored on media device 300. In alternative embodiments, monitor 409 and audio system 410 may be integrated within media device 300. In another embodiment, monitor 409 and audio system 410 may be integrated within host unit 200. Thus through state-based controlling, a user can have a host unit that understands no media codec and has not ability to extract metadata from a file stored on a media device, but the host unit can still provide a full and rich description of the stored content and can playback stored content on a media device.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A system for controlling playback of content stored on a device comprising: at least one host unit for controlling playback of content stored on the device without requiring the content to be transferred to the host unit, wherein the at least one host unit is notified each time a state of the device has changed,
    wherein the host unit is capable of querying the device to determine the state of the device, and
    wherein the state of the device is determined by a playback rate and it is indicated by one or more of the playback rate, a playback object, a playback container index, or a playback position; and
    at least one state-based controller coupled to the at least one host unit to allow the at least one host unit to remotely control the playback of the content through state-based commands, wherein the at least one state-based controller verifies a type of content stored on the device and verifies the state of the device, and wherein the state-based commands are based on the type of the content stored on the device and the state of the device.

2. The system according to claim 1, wherein the device is at least one of an audio player, digital still camera, digital video camera, mobile phone, video player, and media player, and wherein the device being at least one of an audio player, digital still camera, digital video camera, mobile phone, video player, and media player includes a hybrid device that is a combination of an audio player, digital still camera, digital video camera, mobile phone, video player, and media player.

3. The system according to claim 1, wherein the host unit is at least one of an automotive media receiver, set-top box, personal computer, printer, and docking station.

4. The system according to claim 1, wherein the content includes Digital Rights Management (DRM) protected content.

5. The system according to claim 1, wherein installation, drivers, and set-up are not required to enable the host unit to control the playback of the content stored on the device.

6. The system according to claim 1, wherein the at least one host unit communicates with other host units and devices though Media Transfer Protocol (MTP).

7. A method for remotely controlling playback of content stored on a device comprising:
    remotely transmitting state-based commands to a device for controlling playback of content stored on the device, wherein the content is played back without requiring the content to be transferred away from the device, and wherein the state-based commands are based on a current state of the device; and
    updating at least one host unit when a state of the device has changed,
    wherein installation, drivers, and set-up are not used by the at least one host unit to control the playback of the content stored on the device,
    wherein the host unit is capable of querying the device to determine the state of the device, and
    wherein the state of the device is determined by a playback rate and it is indicated by one or more of the playback rate, a playback object, a playback container index, or a playback position.

8. The method according to claim 7, wherein the host unit maintains a record of the current state of the device.

9. The method according to claim 7, wherein the device is at least one of an audio player, digital still camera, digital video camera, mobile phone, video player, and media player, and wherein the device being at least one of an audio player, digital still camera, digital video camera, mobile phone, video player, and media player includes a hybrid device that is a combination of an audio player, digital still camera, digital video camera, mobile phone, video player, and media player.

10. The method according to claim 7, wherein the host unit is at least one of an automotive media receiver, set-top box, personal computer, printer, and docking station.

11. The method according to claim 7, wherein a plurality of host units can control the playback of the content stored on the device.

12. The method according to claim 7, wherein the content includes Digital Rights Management (DRM) protected content.

13. One or more computer-readable media with instructions for executing a method for remotely controlling playback of content stored
    on a device comprising:
    determining a current state of the device;
    determining a type of content stored on the device;
    based on the current state of the device and the type of content stored on the device, remotely transmitting state-based commands to a device for controlling playback of content stored on the device, wherein the content is played back without requiring the content to be transferred away from the device, and wherein the state-based commands are non-interrupt based commands; and
    receiving an update to at least one host unit when a state of the device has changed, wherein the at least one host unit is capable of changing the current state of the device based on a previous state, and wherein installation, drivers, and set-up are not used by the at least one host unit to control the playback of the content stored on the device,
    wherein the host unit is capable of querying the device to determine the state of the device, and
    wherein the state of the device is determined by a playback rate and it is indicated by one or more of the playback rate, a playback object, a playback container index, or a playback position.

14. The computer-readable media according to claim 13, wherein the device is at least one of an audio player, digital still camera, digital video camera, mobile phone, video player, and media player, and wherein the device being at least one of an audio player, digital still camera, digital video camera, mobile phone, video player, and media player includes a hybrid device that is a combination of an audio player, digital still camera, digital video camera, mobile phone, video player, and media player.

15. The computer-readable media according to claim 13, wherein the host unit is at least one of an automotive media receiver, set-top box, personal computer, printer, and docking station.

16. The computer-readable media according to claim 13, wherein the content includes Digital Rights Management (DRM) protected content.

17. The system of claim 1, wherein the state of the device is one or more of a song change, a skip command, or a fast-forward command.

18. The method of claim 7, wherein at least one state-based controller transmits the state-based commands.

19. The method of claim 18, wherein the at least one state-based controller verifies a type of content stored on the device and verifies the state of the device.

* * * * *

UNITED STATES PATENT AND TRADEMARK OFFICE
CERTIFICATE OF CORRECTION

PATENT NO. : 7,627,645 B2  Page 1 of 1
APPLICATION NO. : 11/166714
DATED : December 1, 2009
INVENTOR(S) : Rosenbloom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Second Day of November, 2010

David J. Kappos
*Director of the United States Patent and Trademark Office*